United States Patent [19]

Schaeffer et al.

[11] 4,073,056
[45] Feb. 14, 1978

[54] VEGETABLE PEELER

[75] Inventors: Robert L. Schaeffer, LeRoy; William M. Maher, Churchville, both of N.Y.

[73] Assignee: General Electric Company, Bridgeport, Conn.

[21] Appl. No.: 786,651

[22] Filed: Apr. 11, 1977

[51] Int. Cl.² .............................................. B26B 7/00
[52] U.S. Cl. .................................... 30/123.5; 30/276; 30/289
[58] Field of Search ................. 30/276, 286, 287, 289, 30/123, 123.5, 123.6, 500; 99/593

[56] References Cited

U.S. PATENT DOCUMENTS

| 3,026,612 | 3/1962 | Szczepanski | 30/276 |
| 3,292,679 | 12/1966 | Roth | 30/287 |

FOREIGN PATENT DOCUMENTS

| 505,515 | 5/1939 | United Kingdom | 30/123.5 |

Primary Examiner—Robert C. Watson
Attorney, Agent, or Firm—John F. Cullen; George R. Powers; Leonard J. Platt

[57] ABSTRACT

A vegetable peeler with a handle supporting a cylindrical and electrically rotatable shafted cutter body connected to the handle with a plurality of spaced cutter blades extending longitudinally from the outer to the inner end of the body and a fixed splatter shield partially surrounding and spaced from the body and supported directly on the handle. In this general arrangement there is provided an improved cutter and shield release assembly of a cylindrical tapered support surface on the handle and a matching tapered support surface on the shield for telescopically locking the parts together. A cam and slot connection between the surfaces of different sized pins entering cooperating angled slots cams the tapered surfaces together and locks them. The body has a flared inner end and an abutment is provided on the shield adjacent the flared end so rotation of the shield breaks the tapered connection while simultaneously abutting the body to release the cutter without handling it. The invention is thus directed to an improved cutter and shield release assembly for a vegetable peeler.

4 Claims, 4 Drawing Figures

VEGETABLE PEELER

BACKGROUND OF THE INVENTION

1. Description of the Prior Art

Motorized and powered vegetable peelers and other scrapers as well as individual cutter constructions are all well known. Some peelers involve a detached motor cord connected to an electrically rotatable body carrying a cutter of various types to be pressed against a hard vegetable for peeling. Such a device is shown in U.S. Pat. No. 3,026,612 and in British patent specification No. 505,515. Many different cutter constructions per se are used for cutting wood, peeling plywood layers, and other applications and usually comprise equally spaced blades around a central body with the blade performing a specific operation. The cutters are not selective and they cut wood, metal, plastic, and fingers with equal ease and generally clog on soft, sticky items like vegetables and fruits. An invention directed to a specific cutter construction with a particular relationship between the blades and adjacent cutting recess to minimize the risk of cutting the user's skin is described in application Ser. No. 786,649 filed concurrently and of common assignment. It is also known to provide a splatter shield to deflect the cuttings or peelings as shown in British patent specification No. 505,515. Such shields have not been used for the dual purpose of protecting against peelings and as release mechanism for cutters.

Accordingly, it is an object of the invention to provide a dual purpose cutter and shield release assembly whereby a cutter with longitudinal blades, difficult to remove axially is provided with a shield assembly that automatically cams the handle and shield apart and simultaneously releases the cutter for cleaning.

Another object is to provide such an assembly that is operable in the reverse direction to provide a tight joint between the shield and supporting handle and also to provide an assembly with sized parts for proper orientation in assembly and disassembly.

SUMMARY OF THE INVENTION

Briefly described, there is provided a vegetable peeler with a power handle supporting a cylindrical and electrically rotatable cutter body with a longitudinally removable mounting shaft connected to the handle, the cutter body having a plurality of spaced cutter blades extending longitudinally the length of the body and having a fixed splatter shield partially around and spaced from the body and supported on the handle. In this general arrangement there is provided an improved cutter and shield release assembly of a cylindrical tapered support surface on the handle and matching tapered support surface on the shield for telescopically locking the parts together. A cam and slot connection is provided between the surfaces using different sized cams or pins and cooperating angled slots to cam the parts apart with the different sizes providing a single orientation of the shield. The cutter body has a flared inner end and abutment means adjacent on the shield ensures that rotation of the shield cams the handle and shield apart to break the tapered connection and simultaneously abut the flared end of the cutter body to release the cutter so no handling is required to release it. Thus, the main object is to provide a cutter and shield release assembly for a vegetable peeler which ensures a tight connection between the supporting handle and shield and provides a large mechanical advantage to cam the components apart on rotation of the shield while simultaneously releasing the cutter without touching it with the fingers.

DESCRIPTION OF THE PREFERRED EMBODIMENT

Figure 1:
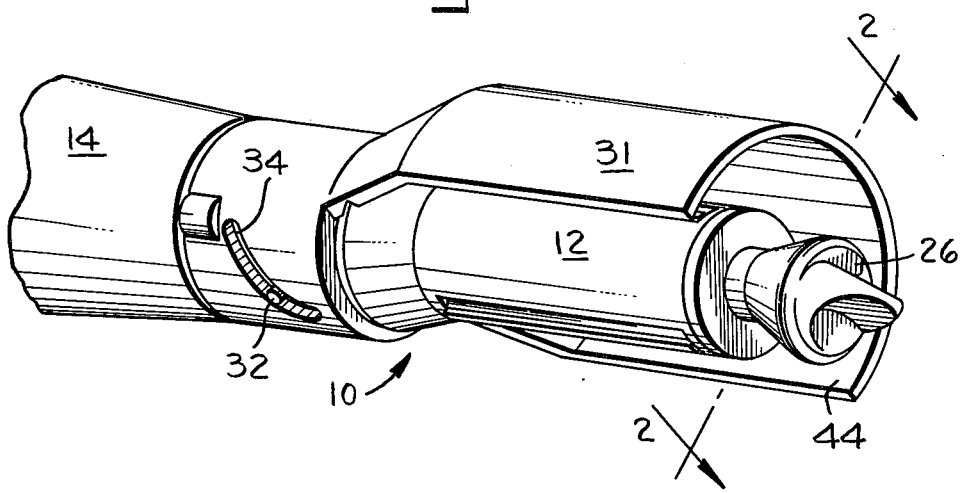
FIG. 1 is a partial perspective of the cutter and shield assembly attached to a power handle.

Referring first to FIG. 1, a cutter mechanism 10 is provided for a vegetable peeler and is made of a cylindrically rotatable body 12 and preferably formed of any suitable plastic such as acetal which is conveniently supported and driven from a power handle 14 as in an electric toothbrush where the handle is either battery powered or cord connected to a source as is well known. The handle 14 rotates body 12 by connecting with a longitudinal mounting shaft 16 which may be snapped into the handle 14 much like the beaters on a mixer. For cutting, individual cutter blade assemblies 18 of longitudinally extending slots containing blades 20 are equally spaced around the periphery of body 12. Each cutter blade 20 extends longitudinally along the entire body surface from the outer end 22 to its inner end 24. Preferably three equally spaced cutter assemblies are spaced around the periphery of the body as partially shown in FIG. 1. An additional eye cutter 26 may be supplied on the end of body 12. The specific details of the particular blade configuration that minimizes the risk of cutting the user's skin is shown in said co-pending application Ser. No. 786,649 and it is with this structure that the present cutter and shield release assembly is used.

Figure 2:
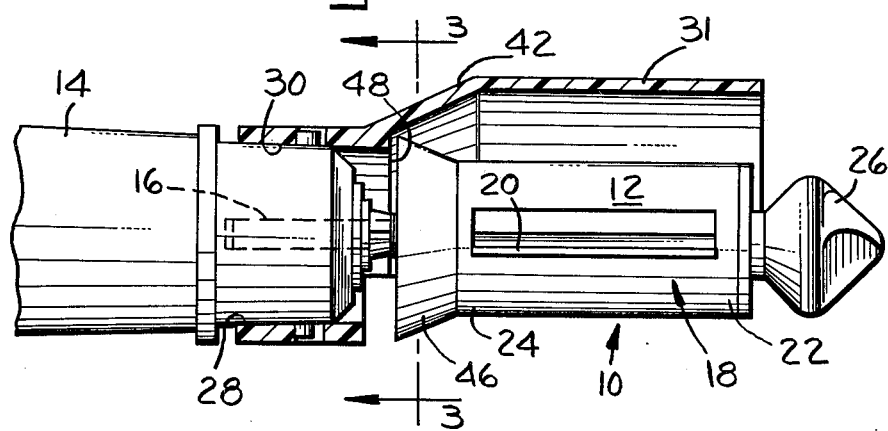
FIG. 2 is a partial cross-section on line 2—2 of FIG. 1.
Figures 3, 4:
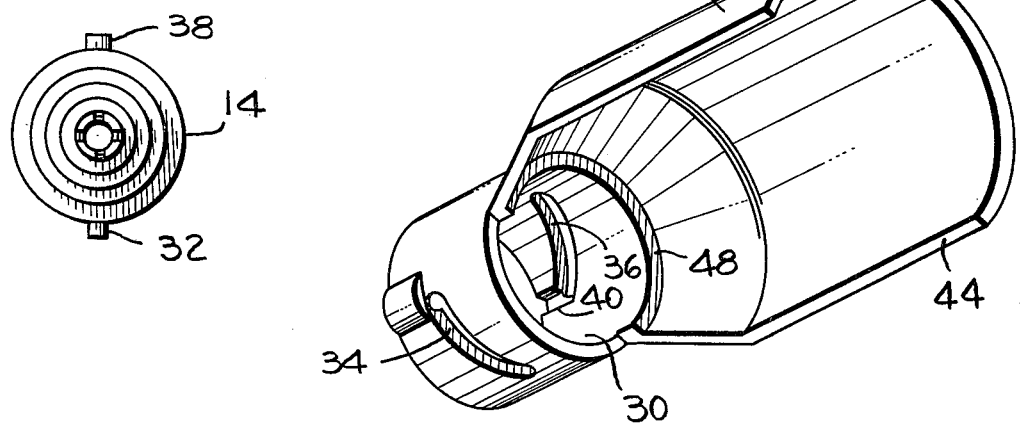
FIG. 3 is a view on line 3—3 of FIG. 2 without the shield and cutter.
FIG. 4 is a perspective view of the shield.

To provide an improved cutter and shield release assembly that forms a solid connection when connected and yet is easily released for cleaning while automatically releasing the cutter body 12, the power handle 14 includes a cylindrical tapered support surface 28 and a matching tapered support surface 30 is provided on the shield for telescopically locking the handle and shield together as shown in FIG. 2. Since matching tapered surfaces inherently provide a tight connection, a cam 32 and angled slot 34 connection is provided between the two surfaces. Preferably, for good balance, this takes the form of a pair of diametrically opposed slots 34, 36 in the shield tapered surface 30 as shown in FIG. 4. Similarly, at least a pair of equally spaced matching pins 32 and 38 are provided that act as cams and cooperate with the slots 34 and 36 respectively on the shield surface. For utilizing the mechanical advantage of the inclined plane to result in a tight connection slots 34 and 36 are angled along their support surface on the shield. Suitable channels or means 40 permit the pins to longitudinally enter the matching slots where, because of the mechanical advantage, the shield is pulled onto surface 28 by simply rotating it into position by camming the tapered surfaces together in a tight fit. To assure that the shield is always oriented properly when mounted, the pins and matching slots may be of different size as shown in FIGS. 3 and 4 so the shield for mounting in only one position.

When the shield is in position on the power handle, rotating cutter body 12 is normally snapped into the handle on longitudinal shaft 16. As seen in FIG. 2, the entire cutting surface is protected by the shield by making it longitudinally coextensive with the cutter and spacing it from the cutter by flaring it outwardly at 42. Since the device is normally used at the sink with the shield toward the operator, the splatter shield extends only partially or about half-way around the cutter so that the peelings may be expelled from the open end 44.

For guiding the peelings away from the cutter body and shaft 16, a flared inner end 46 is provided. In accordance with the invention, it is possible to use this flared end for an additional purpose by providing a shield flare 42 opposite the flare 46. For removing cutter body 12, the shield flare 42 is provided with an abutment means in the form of an internal peripheral groove 48 adjacent and overlapping the cutter flared inner end. This overlapping abutment means eliminates any handling of the cutter body 12 in releasing the body from the power handle.

Thus, in disassembling the tapered connection the pin and angled slots are very useful because of the advantage of the inclined plane since this type of matching tapered connection is very difficult to disassemble by hand. Thus, rotation of the shield easily cams the handle and shield apart to break the tapered connection and then simultaneously the shield abuts cutter body flare 46 to release the cutter from the power handle 14. In actual practice, the shield is held in the hand and turned to cam itself off power handle 14 and force longitudinal release of the cutter by the abutment means whereupon the cutter is dropped without handling into the shield for easy and safe removal.

Thus, the present invention provides an improved cutter and shield release assembly whereby the inherently difficult-to-release type tapered connection uses the mechanical advantage of the inclined plane to both tighten and easily disassemble the connection. Simultaneously, the opposite flares of the shield and cutter body are disposed so the removal of the shield snaps the cutter body from the handle 14 into the shield for easy and safe removal.

While we have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

We claim:

1. A vegetable peeler having a handle supporting a cylindrical and electrically rotatable cutter body with a longitudinally removable mounting shaft connected to said handle, a plurality of spaced cutter blades extending longitudinally from the body outer to inner end and a fixed splatter shield partially around and spaced from said body and supported on said handle, a cutter and shield release assembly comprising, a cylindrical tapered support surface on said handle and a matching tapered support surface on said shield for telescopic locking together, cam and slot connection means between said surfaces, a flared inner end on said body, and abutment means on said shield adjacent said flared end whereby rotation of the shield cams the handle and shield apart to break the tapered connection and simultaneously abuts the body flared end to release the cutter.

2. Apparatus as described in claim 1 wherein the cam and slot connection includes at least a pair of equally spaced pins on said handle surface and cooperating angled slots on said shield surface with means for said pins to longitudinally enter the slots whereby shield rotation cams the tapered surfaces together in a locked connection.

3. Apparatus as described in claim 2 wherein a pair of diametrically opposed pins and slots are provided, the pins and matching slots being different size to ensure a single mounting orientation of the shield.

4. Apparatus as described in claim 3 wherein the shield is longitudinally coextensive with the cutter and flared oppositely to the body flare, and said abutment means is a peripheral groove in the shield flare to abut the end of the body flare and force longitudinal release of the cutter from the handle.

* * * * *